US011297486B2

(12) United States Patent
Yin et al.

(10) Patent No.: US 11,297,486 B2
(45) Date of Patent: Apr. 5, 2022

(54) SYSTEMS AND METHODS TO IMPROVE NETWORK PERFORMANCE IN WIRELESS NETWORKS USING USER MOBILITY PATTERNS

(71) Applicant: Verizon Patent and Licensing Inc., Basking Ridge, NJ (US)

(72) Inventors: Lun Yin, San Jose, CA (US); Le Su, Edison, NJ (US); Dandan Wang, Hoboken, NJ (US); Wenyuan Lu, Raritan, NJ (US); Krishna Pichumani Iyer, Basking Ridge, NJ (US); Khurram Abbas, Novi, MI (US); Steven F. Rice, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/992,567

(22) Filed: Aug. 13, 2020

(65) Prior Publication Data

US 2022/0053312 A1 Feb. 17, 2022

(51) Int. Cl.
*H04W 8/08* (2009.01)
*H04W 64/00* (2009.01)
*H04W 84/18* (2009.01)

(52) U.S. Cl.
CPC ............ *H04W 8/08* (2013.01); *H04W 64/00* (2013.01); *H04W 84/18* (2013.01)

(58) Field of Classification Search
CPC ......... H04W 8/08; H04W 8/18; H04W 64/00; H04W 84/18
See application file for complete search history.

(56) References Cited

U.S. PATENT DOCUMENTS

| 9,243,913 | B1 * | 1/2016 | Lehman | G01C 21/00 |
|---|---|---|---|---|
| 10,575,273 | B2 * | 2/2020 | Zhao | H04W 4/70 |
| 10,880,840 | B1 * | 12/2020 | Mansour | H04W 52/367 |
| 10,945,680 | B2 * | 3/2021 | Frieder | A61B 5/742 |
| 2010/0187281 | A1 * | 7/2010 | Marks | B25C 5/11 227/132 |
| 2015/0038156 | A1 * | 2/2015 | Kilpatrick, II | H04W 68/02 455/452.1 |
| 2016/0026633 | A1 * | 1/2016 | Harding | G06F 16/24578 707/732 |
| 2018/0176325 | A1 * | 6/2018 | Liang | H04L 67/02 |
| 2019/0250243 | A1 * | 8/2019 | Jouaux | G06Q 10/047 |
| 2019/0319868 | A1 * | 10/2019 | Svennebring | H04L 43/08 |
| 2020/0018844 | A1 * | 1/2020 | Fridman | G08G 3/00 |

(Continued)

*Primary Examiner* — Khawar Iqbal

(57) ABSTRACT

A device may include a processor configured to collect historical location data for a user equipment (UE) device associated with a user and determine a movement pattern for the user based on the collected historical location data. The processor may be further configured to obtain current location data for the UE device over a time period; determine a mobility score for the user for the time period based on the determined movement pattern and the obtained current location data, wherein the mobility score is associated with the user's movements during the time period with respect to the determined movement pattern for the user; and provide the determined mobility score for the user to another device configured to adjust one or more parameters of a radio access network (RAN) associated with the UE device based on the determined mobility score.

20 Claims, 13 Drawing Sheets

(56) References Cited

U.S. PATENT DOCUMENTS

2020/0187281 A1* 6/2020 Wang .................... H04L 5/0051
2020/0228529 A1* 7/2020 Douglas ................ H04L 63/105
2020/0329046 A1* 10/2020 Douglas ................ H04L 63/107
2021/0044959 A1* 2/2021 Beaurepaire ............ H04W 4/02
2021/0264304 A1* 8/2021 Poole .................. G06F 11/3065

* cited by examiner

SYSTEMS AND METHODS TO IMPROVE NETWORK PERFORMANCE IN WIRELESS NETWORKS USING USER MOBILITY PATTERNS

BACKGROUND INFORMATION

To satisfy the needs and demands of users of mobile communication devices, providers of wireless communication services continue to improve and expand available services as well as networks used to deliver such services. One aspect of such improvements includes the development of radio access networks as well as options to utilize such radio access networks. A radio access network may include a large number of devices used by different users. Different users may behave differently and such users' behaviors may impact a radio access network in different ways.

DETAILED DESCRIPTION OF PREFERRED EMBODIMENTS

Figure 1:
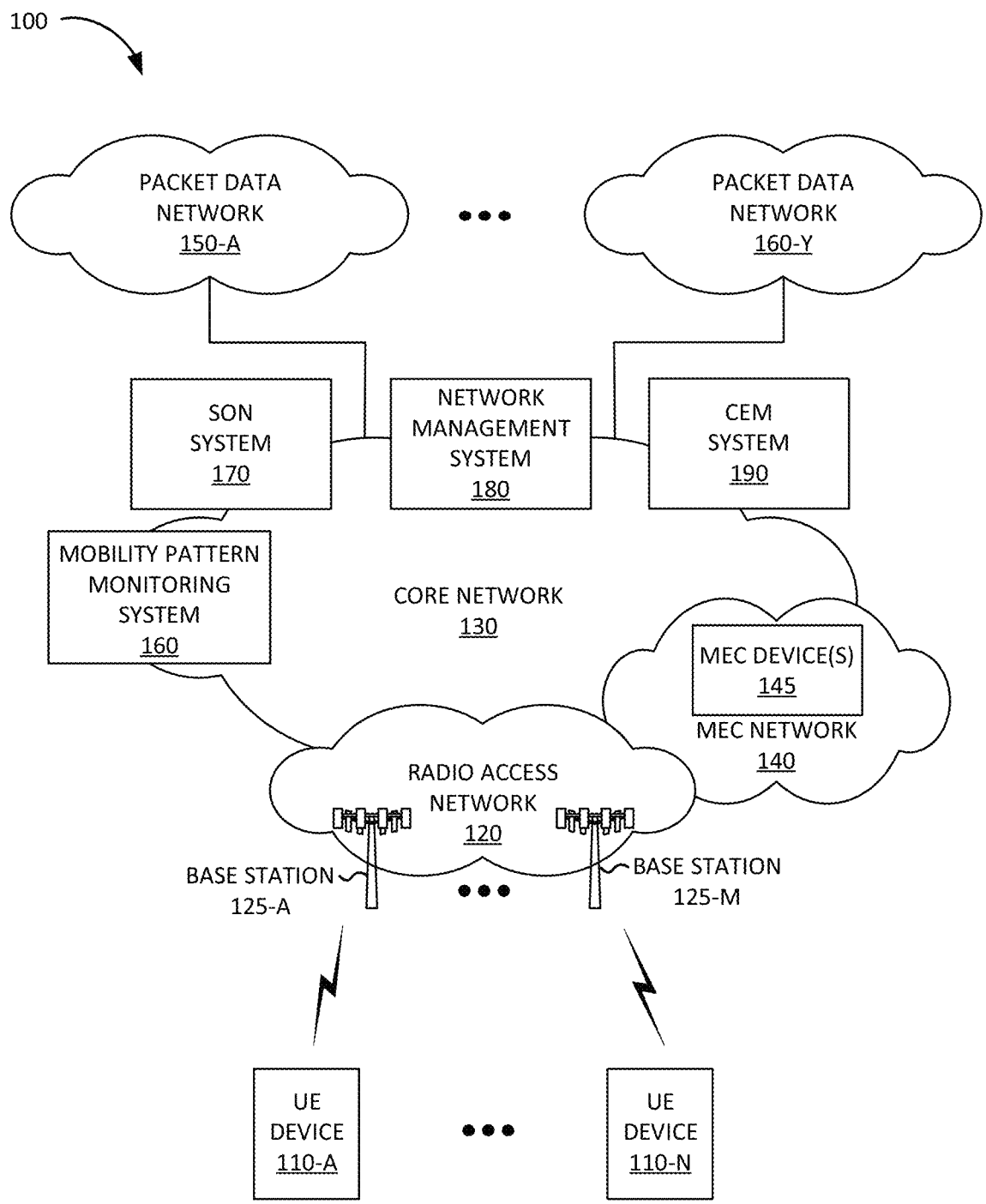
FIG. 1 illustrates an environment according to an implementation described herein.

The following detailed description refers to the accompanying drawings. The same reference numbers in different drawings identify the same or similar elements.

A user may carry a hand-held wireless communication device, such as a smart phone, throughout the day and use the hand-held wireless communication device for making phone calls, sending text messages, streaming video or audio, browsing the Internet, navigation, and/or using installed applications for various tasks. From the perspective of a provider of wireless communication services, the hand-held wireless communication device may be referred to as a user equipment (UE) device. The provider needs to ensure that the user has a positive customer experience and that a radio access network (RAN), which enables the UE device to wirelessly connect to the provider's network via a base station, is functioning efficiently.

The performance of UE devices and the RAN may depend on the mobility patterns of the users of UE devices. As a first example, a user may experience poor network performance, such as dropped calls, slow download speeds, interrupted streaming, and/or other problems. The poor performance might result from the user not using the user's regular travel route and using a travel route with poor signal coverage. As a second example, a user may be experiencing poor network performance at a location where the user spends a lot of time and where the user usually experiences good network performance. The second example may be indicative of a more urgent problem and indicative of a need to assign a higher priority to address the poor network performance by the provider. Thus, the provider may need to be able to distinguish an expected movement pattern for a user from an anomalous movement pattern for the user.

Furthermore, user movement patterns in an area might change. As an example, a road closure or construction may cause users in an area to start using a different road. As another example, a movement restriction policy, such as a work from home policy, a school closure, or a curfew may cause a large number of users to change their daily movement patterns, resulting in changes in data traffic patterns at different base stations and changing the network loads in a RAN that includes the base stations. Thus, monitoring users' movement patterns may enable the provider to more efficiently manage the RAN.

Implementations described herein relate to systems and methods of using mobility patterns to improve network performance in wireless networks. A mobility pattern monitoring system may be configured to determine a mobility score for a user for a time period, such as for a particular day. The mobility score may represent an extent to which the user's movements during the time period deviates from the determined movement pattern for the user. Furthermore, the mobility pattern monitoring system may be configured to determine a mobility profile score for the user that measures an extent to which a daily movement pattern of the user varies. The mobility score and/or the mobility profile score may be provided to a self-organizing network (SON) system to adjust a SON parameter in a RAN (e.g., an antenna tilt parameter, a power distribution parameter, a carrier aggregation parameter, a handover parameter, a neighbor list parameter, a load balancing parameter, etc.), to a network management system to troubleshoot the RAN and/or perform load balancing on the RAN, to a customer experience management (CEM) system to prioritize customer care tickets, and/or to another system to improve network performance and/or to improve customer experience.

Furthermore, the mobility pattern monitoring system may aggregate mobility scores for users in a geographical area and the SON system may adjust a SON parameter for a base station in the geographical area based on the aggregated mobility scores. As an example, the SON system may determine, based on the aggregated mobility scores, that UE devices associated with the base station have changed movement patterns from a first area to a second area and may, in response, adjust an antenna tilt parameter, a power distribution parameter, a carrier aggregation parameter, a handover parameter, and/or a neighbor list parameter for the base station to increase signal coverage in the second area. As another example, the SON system may determine, based on the aggregated mobility scores, that UE devices associated with the base station are associated with lower mobility scores than mobility scores determined for the UE devices during a previous time period and may, in response, adjust an antenna tilt parameter, a power distribution parameter, a carrier aggregation parameter, a handover parameter, and/or a neighbor list parameter for the base station to increase signal capacity in the second area.

The mobility pattern monitoring system may collect historical location data for a UE device associated with a user and determine a movement pattern for the user based on the collected historical location data. The mobility pattern monitoring system may determine the movement pattern for the user by dividing a daily movement pattern associated with the user into a set of geographical time bins. Each geographical time bin may correspond to a location range where the user spends time during a particular range of times each twenty-four-hour period. For example, each geographical time bin may represent a location, in a geographical grid of a particular resolution, where the user is located during the same three-hour period (or time period of a different duration) each day (e.g., between 8 AM and 11 AM, etc.).

Furthermore, the mobility pattern monitoring system may determine a set of primary locations for the user based on a number of most frequently visited geographical time bins from the set of geographical time bins for the user. In some implementations, three primary locations may be determined. In other implementations, a different number of primary locations may be determined.

The mobility pattern monitoring system may determine current location data for the UE device during the time period (e.g., during the most recent 24 hours, week, month, etc.) and use the current location data to determine a set of parameters for the user for the time period. The set of parameters may include a geographical time bin missing rate, an off-center distance, and/or an area of extent for the user for the time period. The set of parameters may then be used to compute the mobility score for the user for the time period.

The mobility pattern monitoring system may determine a geographical time bin missing rate for the user for the time period based on the obtained current location data and the set of geographical time bins. The geographical time bin missing rate may be based on the number of geographical time bins, from the set of geographical time bins for the user, that are not visited by the user during the time period.

The mobility pattern monitoring system may determine an off-center distance for the user for the time period based on the obtained current location data and the set of primary locations. The off-center distance may correspond to a distance of the user during the time period from a closest primary location of the set of primary locations.

The mobility pattern monitoring system may determine an area of extent for the user for the time period based on the obtained current location data. The area of extent for the user for the time period may be based on maximum latitudinal and longitudinal differences between geographical time bins visited by the user during the time period.

The mobility pattern monitoring system may normalize the determined geographical time bin missing rate, the off-center distance, and the area of extent and compute the mobility score for the user for the time period as a geometric mean of these three values. Thus, mobility pattern monitoring system may compute the mobility score for the user for the time period as, for example, the cube root of the product of the normalized geographical time bin missing rate, off-center distance, and area of extent.

As mentioned above, the mobility pattern monitoring system may also determine a mobility profile score for the user. In some implementations, the mobility pattern monitoring system may determine multiple mobility profile scores for the user, such as, for example, a short-term mobility profile score for the user that measures an extent to which a daily movement pattern of the user varies over a first number of days (e.g., 14 days, etc.) and a long-term mobility profile score for the user that measures an extent to which the daily movement pattern of the user varies over a second number of days (e.g., 28 days, etc.). The mobility profile score for the user may be based on the off-center distance and the geographical time bin missing rate for the user during the most recent number of days (e.g., most recent 14 days, most recent 28 days, etc.).

FIG. 1 is a diagram of an exemplary environment 100 in which systems and/or methods, described herein, may be implemented. As shown in FIG. 1, environment 100 may include UE devices 110-A to 110-N (referred to herein collectively as "UE devices 110" and individually as "UE device 110"), RAN 120 that includes base stations 125-A to 125-M (referred to herein collectively as "base stations 125" and individually as "base station 125"), core network 130, a Multi-Access Edge Computing (MEC) network 140 that includes MEC device(s) 145, packet data networks 150-A to 150-Y (referred to herein collectively as "packet data networks 150" and individually as "packet data network 150"), a mobility pattern monitoring system 160, a SON system 170, a network management system 180, and a CEM system 190.

UE device 110 may communicate with base station 125 using cellular wireless signals. UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer device with wireless communication capabilities and/or a user interface. In some implementations, UE device 110 may communicate using machine-to-machine (M2M) communication, such as Machine-Type Communication (MTC), and/or another type of M2M communication for Internet of Things (IoT) applications. For example, UE device 110 may include a mobile health monitoring device (e.g., a blood pressure monitoring device, a blood glucose monitoring device, etc.), a vehicle tracking device, a vehicle sensor, an autonomous vehicle or an unmanned aerial drone, and/or another type mobile IoT device.

RAN 120 may include base stations 125. In some implementations, base station 125 may include a Fifth Generation (5G) New Radio (NR) base station, also referred to as a gNodeB. In other implementations, base station 125 may include a Fourth Generation (4G) Long Term Evolution (LTE) base station, also referred to as an eNodeB. Each base station 125 may include devices and/or components, including wireless transceivers and antenna arrays, to enable wireless communication with UE devices 110.

RAN 120 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Core network 130 may manage communication sessions for UE devices serviced by base station 125. For example, core network 130 may establish an Internet Protocol (IP) connection between UE devices and a packet data network 150. In some implementations, core network 130 may include an LTE core network (e.g., an evolved packet core (EPC) network). An EPC network may include devices that implement: network functions that include a Mobility Management Entity (MME) for control plane processing, authentication, mobility management, tracking and paging, and activating and deactivating bearers; a Serving Gateway (SGW) that provides an access point to and from UE devices 110, acts as a local anchor point during handovers, and directs gateway to a Packet Data Network Gateway (PGW); a PGW that functions as a gateway to a particular packet data network 150; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices 110, including subscription profiles that include authentication and access authorization information, group device memberships, subscription privileges, and/or other types of subscription information.

In other implementations, core network 130 may include a 5G core network. A 5G core network may include devices that implement network functions that include an Access and Mobility Function (AMF) to perform registration management, connection management, reachability management, mobility management, and/or lawful intercepts; a Session Management Function (SMF) to perform session management, session modification, session release, IP allocation and management, Dynamic Host Configuration Protocol (DHCP) functions, and selection and control of a User Plane Function (UPF); a UPF to serve as a gateway to packet data network 150, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device; and/or other types of network functions.

Base station 125 may be associated with MEC network 140. MEC network 140 may provide MEC services for UE devices 110 attached to base station 125. MEC network 140 may be in proximity to the one or more base stations 125 from a geographic and network topology perspective. As an example, MEC network 140 may be located on a same site as base station 125. As another example, MEC network 140 may be geographically closer to base station 125, and reachable via fewer network hops and/or fewer switches, than other base stations and/or packet data networks 150. As yet another example, MEC network 140 may be reached without having to interface with a gateway device, such as a 4G Packet Data Network Gateway (PGW) or a 5G User Plane Function (UPF). MEC network 140 may interface with RAN 120 and/or with core network 130 via a MEC gateway device (not shown in FIG. 1). In some implementations, MEC network 140 may be connected to RAN 120 via a direct connection to base station 125. In other implementations, MEC network 140 may include, or be included in, core network 130.

MEC network 140 may include a MEC device 145. MEC network 140 may support device registration, discovery, and/or management of MEC devices 145 in MEC network 140. MEC device 145 may include particular hardware components, such as central processing units (CPUs), graphics processing units (GPUs), tensor or dataflow processing units, hardware accelerators, and/or other types of hardware components. Furthermore, MEC device 145 may include particular software components, such as a particular operating system, virtual machine, virtual container, application, and/or another type of software components or programs. MEC device 145 may connect to base station 125 in RAN 120 and provide one or more MEC services to UE devices connected to base station 125.

Packet data networks 150-A to 150-N may each include a packet data network. A particular packet data network 150 may be associated with an Access Point Name (APN) and a UE device 110 may request a connection to the particular packet data network 150 using the APN. Packet data network 150 may include, and/or be connected to and enable communication with, a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, an intranet, or a combination of networks.

Mobility pattern monitoring system 160 may include one or more computer devices, such as server devices and/or cloud computing devices, configured to obtain historical location data for UE devices 110 and determine mobility patterns for users associated with UE devices 110. Mobility pattern monitoring system 160 may then monitor the movement patterns for UE devices 110 for time periods of particular duration (e.g., each day, etc.) and calculate a mobility score for each user that reflects an extent to which the user's movements during a time period deviate from the determined movement pattern for the user. Mobility pattern monitoring system 160 may further determine a mobility profile score for the user that measures an extent to which a daily movement pattern of the user varies. Mobility pattern monitoring system 160 may provide the determined mobility scores and/or mobility profile scores to SON system 170, network management system 180, and/or CEM system 190.

SON system 170 may include one or more computer devices, such as server devices and/or cloud computing devices, configured to perform self-organization functions for RAN 120 and/or core network 130. SON system 170 may obtain information relating to UE devices 110 and/or base stations 125 and may perform SON actions based on the obtained information. For example, SON system 170 may send an instruction to base station 125, such as, for example, an instruction to adjust an antenna tilt parameter, a carrier aggregation parameter, a handover parameter, a neighbor list parameter, a delay optimization parameter, a random access channel parameter, a coverage optimization parameter, a power distribution parameter, a load balancing parameter, and/or another type of SON parameter. SON system 170 may receive mobility pattern information, such as mobility scores, mobility profile scores, and/or primary locations for users associated with UE devices 110, from mobility pattern monitoring system 160 and select to adjust a SON parameter for one or more base station 125s based on the received mobility pattern information.

Network management system 180 may include one or more computer devices, such as server devices and/or cloud computing devices, configured to manage particular operations of RAN 120 and/or core network 130. For example, network management system 180 may monitor RAN 120 and/or core network 130 for the status of particular devices and/or links by receiving heartbeat messages, status reports, and/or error messages and/or by querying devices in RAN 120 and/or core network 130 at particular intervals. Network management system 180 may generate maintenance and/or repair tickets based on the obtained status information. Furthermore, network management system 180 may monitor the capacity of devices and/or links in RAN 120 and/or core network 130 and may perform load balancing in RAN 120 and/or core network 130 to improve the performance of RAN 120 and/or core network 130. Network management system 180 may receive mobility pattern information, such as mobility scores, mobility profile scores, and/or primary locations for users associated with UE devices 110, from mobility pattern monitoring system 160 and generate/prioritize maintenance or repair tickets and/or perform a load balancing action based on the received information.

CEM system 190 may include one or more computer devices, such as server devices and/or cloud computing devices, configured to manage customer experience for customers serviced by a provider of wireless communication services associated with RAN 120 and/or core network 130. For example, CEM system 190 may include an interactive voice response (IVR) system that answers a call from UE device 110, plays an initial greeting, and prompts the customer using UE device 110, via played audio messages, to provide information to the IVR system. Additionally, or alternatively, CEM system 190 may receive instant messages (IMs), short message service (SMS) format messages, emails, messages received via a CEM application installed on UE device 110, and/or other types of messages from customers. CEM system 190 may then route the call and/or messages to a customer service agent to assist the customer with the customer's concerns. CEM system 190 may receive mobility pattern information, such as mobility scores, mobility profile scores, and/or primary locations for users associated with UE devices 110, from mobility pattern monitoring system 160 and prioritize customer service tickets based on the received information.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

For example, while mobility pattern monitoring system 160, SON system 170, network management system 180, and CEM system 190 are shown as being part of core network 130, in other implementations, any of mobility pattern monitoring system 160, SON system 170, network management system 180, and/or CEM system 190 may be included in packet data network 150 or in MEC network 140 via one or more MEC devices 145. Furthermore, in some implementations, some or all of the functionality of mobility pattern monitoring system 160 may be implemented in any of SON system 170, network management system 180, and/or CEM system 190.

Figure 2:
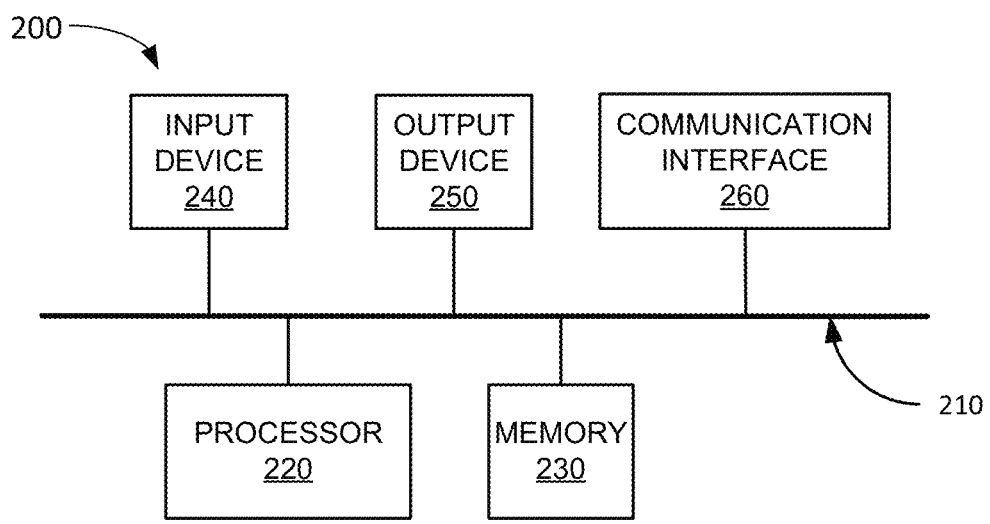
FIG. 2 illustrates exemplary components of a device that may be included in components of the environment of FIG. 1 according to an implementation described herein.

FIG. 2 is a diagram illustrating example components of a device 200 according to an implementation described herein. UE device 110, base station 125, MEC device 145, mobility pattern monitoring system 160, SON system 170, network management system 180, and/or CEM system 190 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250.

In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to determining mobility patterns for users and using the mobility patterns to improve network performance in wireless networks. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
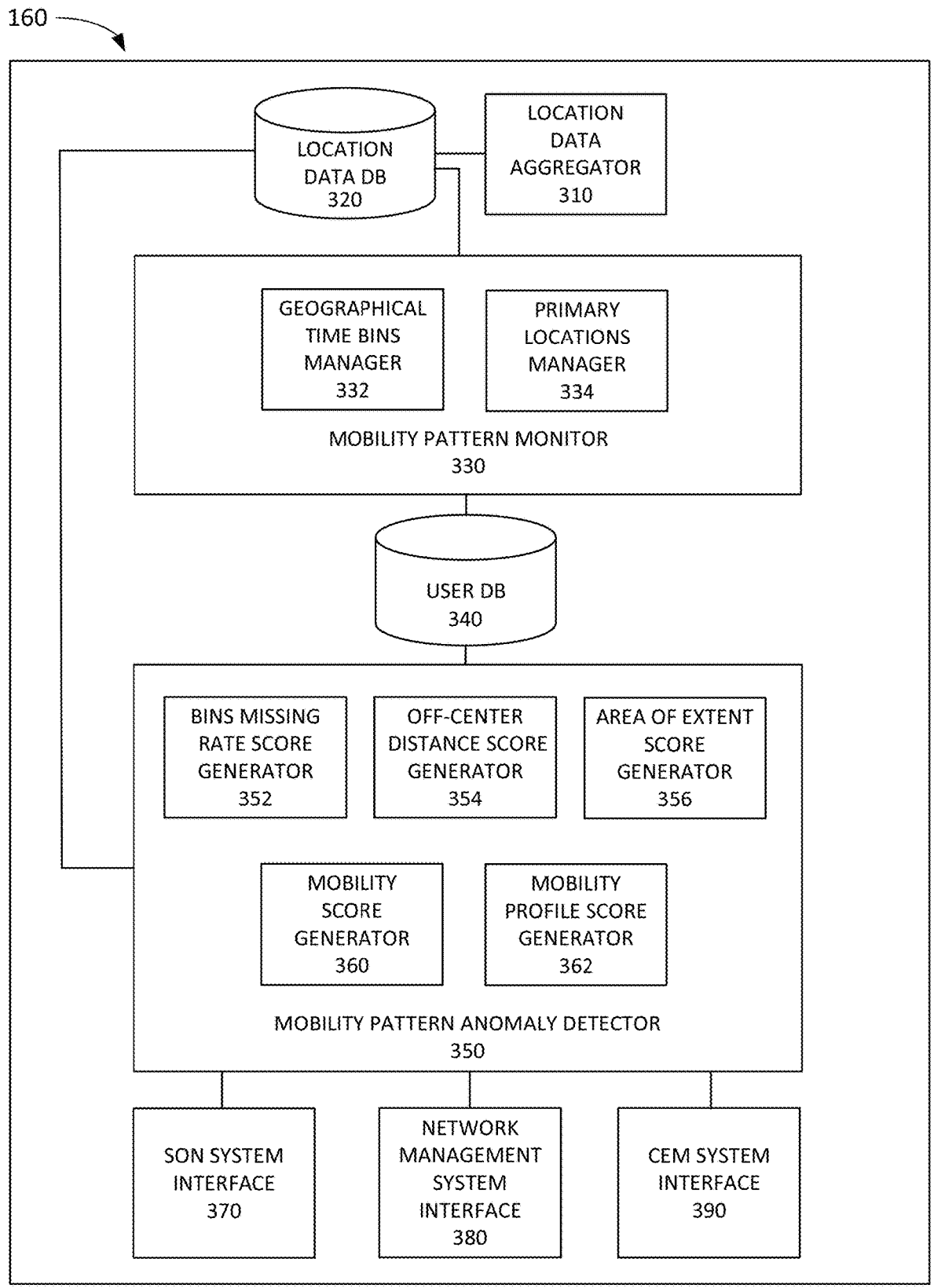
FIG. 3 illustrates exemplary components of the mobility pattern monitoring system of FIG. 1 according to an implementation described herein.

FIG. 3 is a diagram illustrating exemplary components of mobility pattern monitoring system 160. The components of mobility pattern monitoring system 160 may be implemented, for example, via processor 220 executing instructions from memory 230. Alternatively, some or all of the components of mobility pattern monitoring system 160 may be implemented via hardwired circuitry. Furthermore, some or all of the components of mobility pattern monitoring system 160 may be implemented using one or more hardware accelerators, such as GPUs, tensor or dataflow processing units, and/or other types of hardware accelerators.

As shown in FIG. 3, mobility pattern monitoring system 160 may include a location data aggregator 310, a location data database (DB) 320, a mobility pattern monitor 330, a user DB 340, a mobility pattern anomaly detector 350, a SON system interface 370, a network management system interface 380, and a CEM system interface 390.

Location data aggregator 310 may obtain a time series of location data for a user associated with UE device 110 and store the obtained time series data in location data DB 320. In some implementations, location data aggregator 310 may receive the time series of location data directly from UE device 110 and/or base station 125. In other implementations, UE device 110 and/or base station 125 may provide the location data to another system that collects data associated with UE devices 110 and the system may provide the location data to location data aggregator 310.

Mobility pattern monitor 330 may determine a mobility pattern associated with a user and store the mobility pattern information in user DB 340. Exemplary information that may be stored in user DB 340 is described below with reference to FIG. 4. Mobility pattern monitor 330 may include a geographical time bins manager 332 and a primary locations manager 334.

Geographical time bins manager 332 may manage geographical time bins associated with a user. For example, geographical time bins manager 332 may select a time resolution and divide the time period used to determine mobility score (e.g., a 24-hour period) into time bins based on a selected time resolution (e.g., a three-hour period). Geographical time bins manager 332 may then select a geographical grid resolution (e.g., 100 meters, etc.) and divide a geographical grid into geographical bins with latitude and longitude dimensions based on the grid resolution. A geographical time bin may then be defined as a geographical bin during a particular time bin. Each geographical time bin visited by the user during a lookback period, for which the historical location data was obtained and used to generate the geographical time bins for the user, may be assigned a weight based on the number of times the geographical time bin was visited by the user. Geographical time bins that have fewer occurrences during the lookback period than an occurrences threshold may not be included in the geographical time bins associated with the user's regular movements.

Primary locations manager 334 may determine a set of "n" primary locations for the user. In some implementations, primary locations manager 334 may select three primary locations (which may correspond to a home location, a work location, and another location where the user spends a lot of time). In other implementations, primary locations manager 334 may select a different number of primary locations. Primary locations manager 334 may determine the primary locations by selecting "m" of the top most visited geographical bins associated with the user over the lookback period, selecting the most frequently visited location cell of a finer resolution in each of the m most frequently visited geographical bins, eliminating less frequently visited location cells of each pair of location cells that are within a threshold distance of each other, and keeping the top n most frequently visited location cells as the primary locations for the user.

Mobility pattern anomaly detector 350 may detect how anomalous a user's movement pattern is during a time period based on location data associated with the time period. Mobility pattern anomaly detector 350 may include a bins missing rate score generator 352, an off-center distance score generator 354, an area of extent score generator 356, a mobility score generator 360, and a mobility profile score generator 362.

Bins missing rate score generator 352 may determine a geographical time bins missing rate score for the user for the time period as a measure of how much the user's movements during the time period differed from the user's regular movements as determined by the user's geographical time bins. Bins missing rate score generator 352 may determine a weight for each unique geographical time bin visited during the time period as a ratio of the number of occurrences of the geographical time bin to a total number of occurrences of all the geographical time bins over the lookback period. Bins missing rate score generator 352 may then set the geographical time bins missing rate score as the complement of the sum of the visited regular geographical time bin weights (i.e., one minus the sum of the visited regular geographical time bin weights).

Off-center distance score generator 354 may determine an off-center distance score for the user for the time period as a measure of how far the user travelled from the user's primary locations. Off-center distance score generator 354 may determine the distance from each visited geographical time bin during the time period to the closest primary location for the visited geographical time bin, and may average to computed distances to determine the off-center distance score for the user during the time period.

Area of extent score generator 356 may determine an area of extent score for the user for the time period as a measure of how much area the user covered during the time period. Area of extent score generator 356 may compute a sum of the difference between the maximum and minimum latitude associated with all the visited geographical time bin during the time period to generate the area of extent score for the user during the time period.

Mobility score generator 360 may determine a mobility score for the user for the time as a measure of how much the user's movements during the time period deviate from the determined movement pattern for the user. Mobility score generator 360 may determine the mobility score based on the geographical time bins missing rate score for the user for the time period, the off-center distance score for the user for the time period, and the area of extent score for the user for the time period. For example, mobility score generator 360 may compute the mobility score as a geometric mean of a normalized geographical time bins missing rate score, normalized off-center distance score, and normalized area of extent score.

Mobility profile score generator 362 may determine a mobility profile score for the user as a measure of an extent to which a daily movement pattern of the user varies. For example, a mobility profile score of 0 may indicate a user whose daily movement follows a standard pattern (e.g., from home to a work location and back) on a regular schedule; a mobility profile score of 1 may indicate a user whose daily movement follows a standard pattern most of the time with a slight variation in terms of pattern and distance; a mobility profile score of 2 may indicate a user that does not have a consistent pattern of movement and whose movements are confined to a local area; and a mobility profile score of 3 may indicate a user that travels long distance more than a threshold number of days out of the lookback period (e.g., more than 5 days each 35 days, etc.). Mobility profile score generator 362 may compute a short-term mobility profile score for the user based on a first lookback period (e.g., 14 days, etc.) and a long-term mobility profile score for the user based on a second lookback period that is longer than the first lookback period (e.g., 28 days, etc.). The mobility profile scores may be based on a set of geographical time bins missing rate score thresholds and a set of off-center distance score thresholds. An exemplary set of thresholds is described below with reference to FIG. 13.

Mobility pattern anomaly detector 350 may aggregate mobility scores and/or mobility profile scores for users and may provide the aggregated data to SON system 170, network management system 180, and/or CEM system 190. SON system interface 370 may be configured to communicate with SON system 170 and provide mobility pattern data relating to users to SON system 170. Network management system interface 380 may be configured to communicate with network management system 180 and provide mobility pattern data relating to users to network management system 180. CEM system interface 390 may be configured to communicate with CEM system 190 and provide mobility pattern data relating to users to CEM system 190.

Although FIG. 3 shows exemplary components of mobility pattern monitoring system 160, in other implementations, mobility pattern monitoring system 160 may include fewer components, different components, differently arranged components, or additional components than depicted in FIG. 3. Additionally, or alternatively, one or more components of mobility pattern monitoring system 160 may perform functions described as being performed by one or more other components of mobility pattern monitoring system 160.

Figure 4:
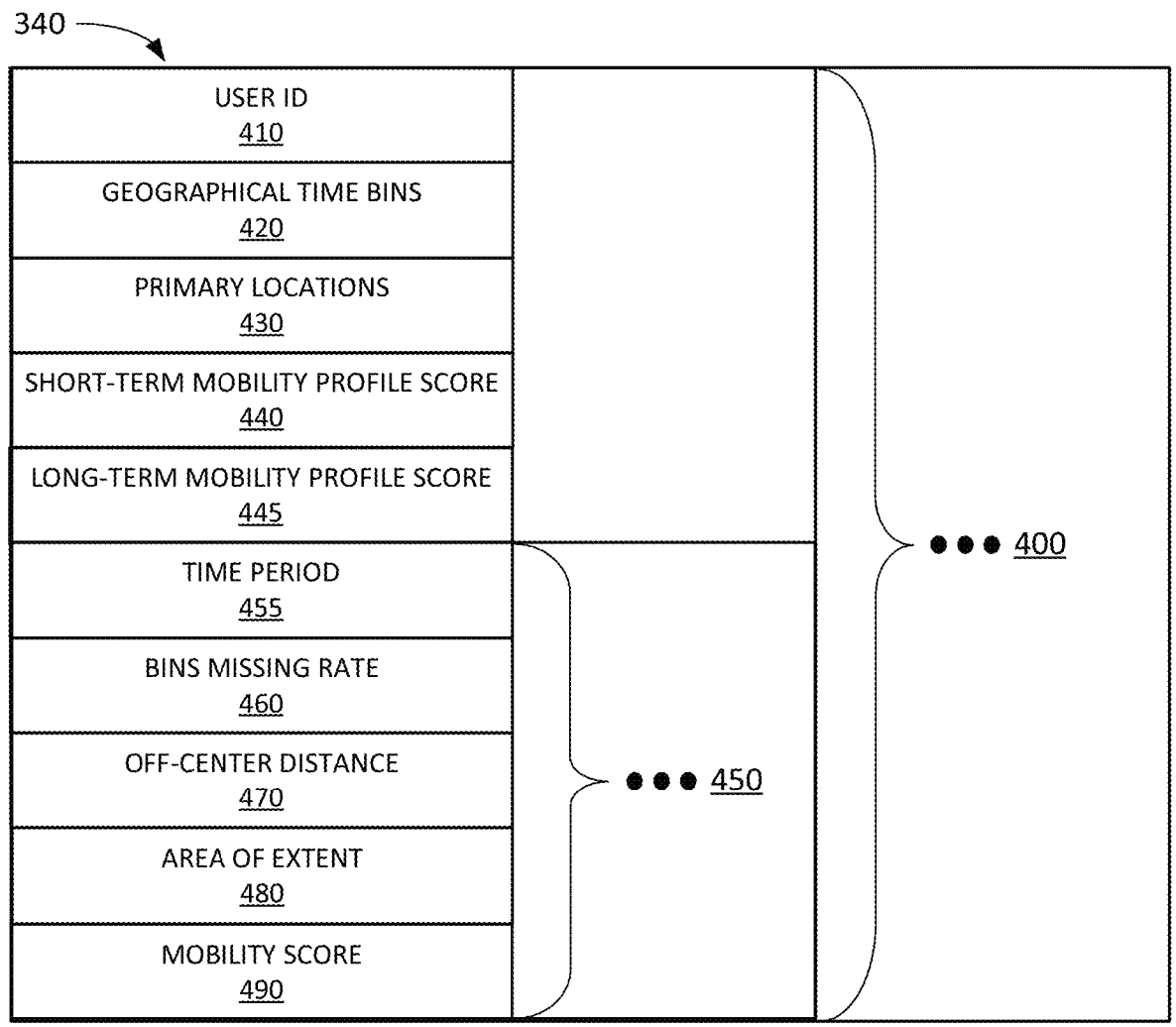
FIG. 4 illustrates exemplary components of the user database of FIG. 3 according to an implementation described herein.

FIG. 4 illustrates exemplary components of user DB 340 according to an implementation described herein. As shown in FIG. 4, user DB 340 may include user records 400. Each user record 400 may store information relating to mobility information for a particular user. User record 400 may include a user identifier (ID) field 410, a geographical time bins field 420, a primary locations field 430, a short-term mobility profile score field 440, a long-term mobility profile score field 445, and time period fields 450.

User ID field 410 may store an identifier associated the particular user. For example, user ID field 410 may store a customer account number, an International Mobile Equipment Identity (IMEI), a Mobile Directory Number (MDN), an International Mobile Subscriber Identity (IMSI), a Mobile Station International Subscriber Directory Number (MSISDN), an IP address, a Media Access Control (MAC) address, and/or another type of identifier associated with UE device 110.

Geographical time bins field 420 may store information identifying the geographic time bins associated with the particular user. Primary locations field 430 may store information identifying a set of primary locations associated with the user. Short-term mobility profile score field 440 may store a short-term mobility profile score associated with the user. Long-term mobility profile score field 445 may store a long-term mobility profile score associated with the user.

Each time period field 450 may each store mobility pattern information for the user for a time period (e.g., for a day or 24-hour period, etc.). Time period field 455 may store information identifying the particular time period. Bins missing rate field 460 may store the geographical time bins missing rate score for the user for the particular time period. Off-center distance field 470 may store an off-center distance score for the user for the particular time period. Area of extent field 480 may store an area of extent score for the user for the particular time period. Mobility score field 490 may store a mobility score for the user for the particular time period.

Although FIG. 4 shows exemplary components of user DB 340, in other implementations, user DB 340 may include fewer components, different components, additional components, or differently arranged components than depicted in FIG. 4.

Figure 5:
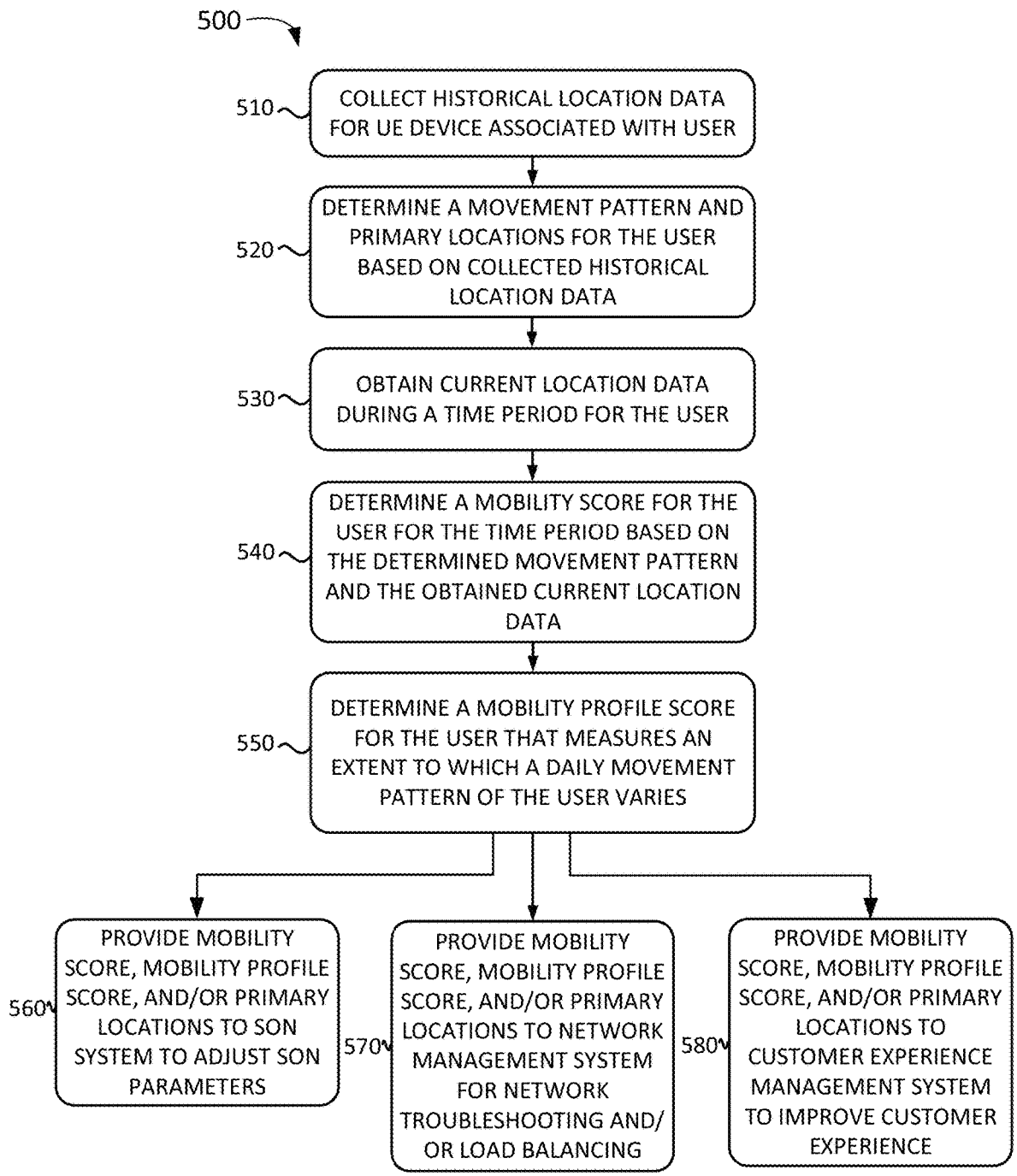
FIG. 5 illustrates a flowchart of a process for determining a mobility pattern for a user according to an implementation described herein.

FIG. 5 illustrates a flowchart of a process 500 for determining a mobility pattern for a user according to an implementation described herein. In some implementations, process 500 of FIG. 5 may be performed by mobility pattern monitoring system 160. In other implementations, some or all of process 500 may be performed by another device or a group of devices separate from mobility pattern monitoring system 160, such as SON system 170, network management system 180, and/or CEM system 190.

As shown in FIG. 5, process 500 may include collecting historical location data for UE device 110 associated with a user (block 510) and determining a movement pattern for the user based on the collected historical location data (block 520). For example, mobility pattern monitoring system 160 may collect time series location data for UE device 110 associated with a user and determine a set of geographical time bins and primary locations for the user based on the collected time series location data.

Process 500 may further include obtaining current location data during a time period for the user (block 530) and determining a mobility score for the user for the time period based on the determined movement pattern and the obtained current location data (block 540). For example, mobility pattern monitoring system 160 may obtain time series location data for a time period (e.g., the most recent 24 hours, etc.) for UE device 110 associated with the user and determine the mobility score for the user for the time period based on the obtained time series location data for the user. An exemplary process for computing the mobility score for the user is described below with reference to process 600 of FIG. 6.

Process 500 may further include determining a mobility profile score for the user that measures an extent to which a daily movement pattern of the user varies (block 550). For example, mobility pattern monitoring system 160 may generate a mobility profile score of 0, which indicates a user whose daily movement follows a standard pattern on a regular schedule, if the user's geographical time bins missing rate score is less than a first bins missing rate threshold and if the user's off-center distance score is less than a first off-center distance threshold; a mobility profile score of 1, which indicates a user whose daily movement follows a standard pattern most of the time with a slight variation in terms of pattern and distance, if the user's geographical time bins missing rate score is less than the first bins missing rate threshold and the user's off-center distance score is between the first off-center distance threshold and a second off-center distance threshold, or if the user's geographical time bins missing rate score is between the first bins missing rate threshold and a second bins missing rate threshold and less than the first off-center distance threshold; a mobility profile score of 2, which indicates a user that does not have a consistent pattern of movement and whose movements are confined to a local area, if the user's geographical time bins missing rate score is between the first bins missing rate threshold and the second bins missing rate threshold and the user's off-center distance score is between the first off-center distance threshold and the second off-center distance threshold, or if the user's geographical time bins missing rate score is greater than the second bins missing rate threshold and the user's off-center distance score is less than a third off-center distance threshold; and a mobility profile score of 3, which indicates a user that travels long distance more than a threshold number of days out of the lookback period, if the user's off-center distance score is greater than a third off-center distance threshold.

Mobility pattern monitoring system 160 may compute a short-term mobility profile score for the user based on a first lookback period (e.g., 14 days, etc.) and a long-term mobility profile score for the user based on a second lookback period that is longer than the first lookback period (e.g., 28 days, etc.).

Process 500 may further include providing the mobility score, mobility profile score, and/or primary locations to SON system 170 to adjust SON parameters (block 560). For example, mobility pattern monitoring system 160 may aggregate mobility scores, mobility profile scores, and/or primary locations information for a geographic area, for a particular base station 125, for a particular sector of base station 125, and/or for a grouping of base stations 125 and provide the aggregated mobility scores and/or mobility profile scores to SON system 170. SON system 170 may use the aggregated mobility scores and/or mobility profile scores to adjust an antenna tilt parameter, a carrier aggregation parameter, a handover parameter, a neighbor list parameter, a delay optimization parameter, a random access channel parameter, a coverage optimization parameter, a power distribution parameter, a load balancing parameter, and/or another type of SON parameter.

For example, SON system 170 may determine that users' movement patterns have changed from a first area to a second area and may adjust one or more SON parameters to provide better signal coverage to the second area. As an example, the aggregated mobility scores may indicate that users in a particular area switched from using a first road or route to a second road or route, based on increased mobility scores associated with the second road or route, and may adjust an antenna tilt parameter, a power distribution parameter, a handover parameters, and/or a neighbor list parameter to provide better coverage along the second road.

As another example, SON system 170 may determine, based on the aggregated mobility scores, that UE devices associated with base station 125 are associated with lower mobility scores than mobility scores determined for the UE devices during a previous time period and may, in response, adjust one or more SON parameters to increase signal capacity. For example, SON system 170 may determine that mobility scores in an area covered by base station 125 have decreased over time due to the users in the area traveling less and spending more time at home. In response, SON system 170 may increase signal capacity in the area by adjusting an antenna tilt parameter, a power distribution parameter, a handover parameter, and/or a neighbor list parameter associated with base station 125.

Process 500 may further include providing the mobility score, mobility profile score, and/or primary locations to network management system 180 for troubleshooting and/or load balancing (block 570). For example, mobility pattern monitoring system 160 may aggregate mobility scores, mobility profile scores, and/or primary locations information for a geographic area, for a particular base station 125, for a particular sector of base station 125, and/or for a grouping of base stations 125 and provide the aggregated mobility scores and/or mobility profile scores to network management system 180. Network management system 180 may use the received information to prioritize maintenance and/or repair tickets. For example, a maintenance or repair ticket associated with a particular base station 125 with a large number of low mobility profile score users may be given a higher priority, since the low mobility profile score users may spend long periods of time communicating with a particular base station 125. As another example, if users' mobility patterns change toward an area associated with a particular base station 125, network management system 180 may generate a maintenance ticket to increase a capacity of the particular base station 125.

Process 500 may further include providing the mobility score, mobility profile score, and/or primary locations to CEM system 190 to improve customer experience (block 580). For example, mobility pattern monitoring system 160 may provide a mobility score and/or a mobility profile score associated with a user to CEM system 190. CEM system 190 may assign a priority score to a customer ticket for a user based on a mobility score and/or a mobility profile score associated with the user. For example, a user with a low mobility score may be assigned a higher priority, since the user may be experiencing a service issue in the user's primary location.

Figure 6:
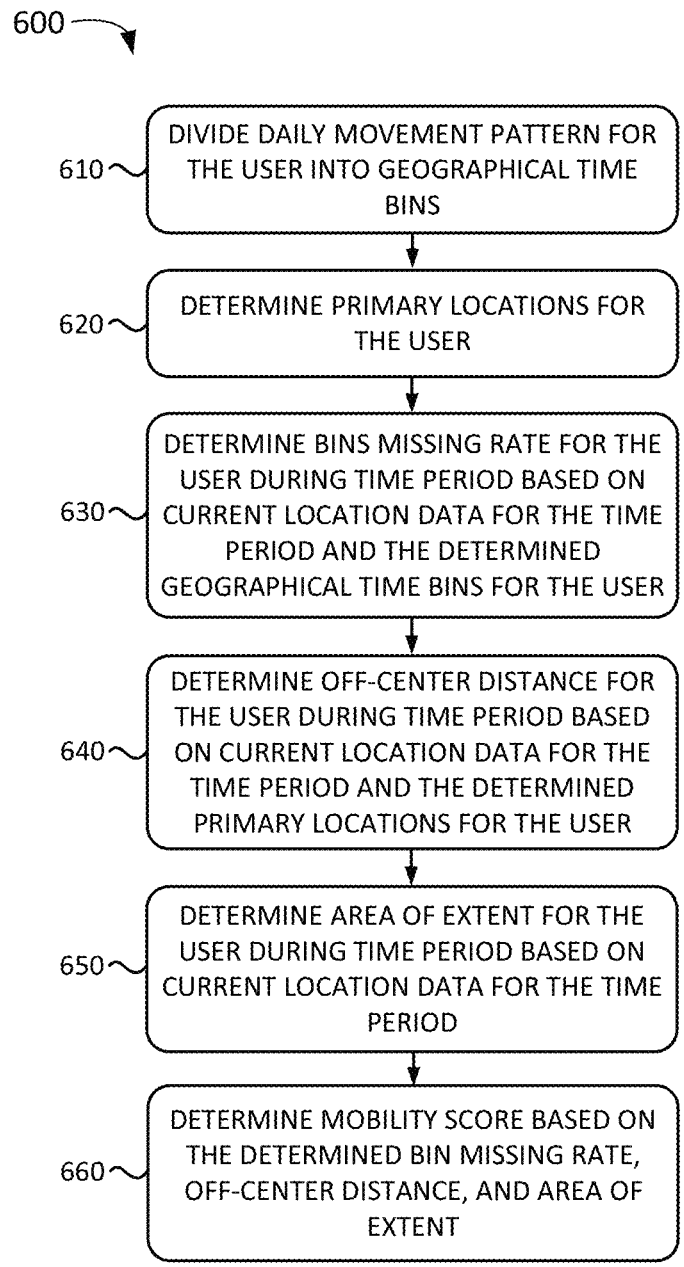
FIG. 6 illustrates a flowchart of a process for computing a mobility score according to an implementation described herein.

FIG. 6 illustrates a flowchart of a process 600 for computing a mobility score according to an implementation described herein. In some implementations, process 600 may be performed by mobility pattern monitoring system 160. In other implementations, some or all of process 600 may be performed by another device or a group of devices separate from mobility pattern monitoring system 160.

Figure 9:
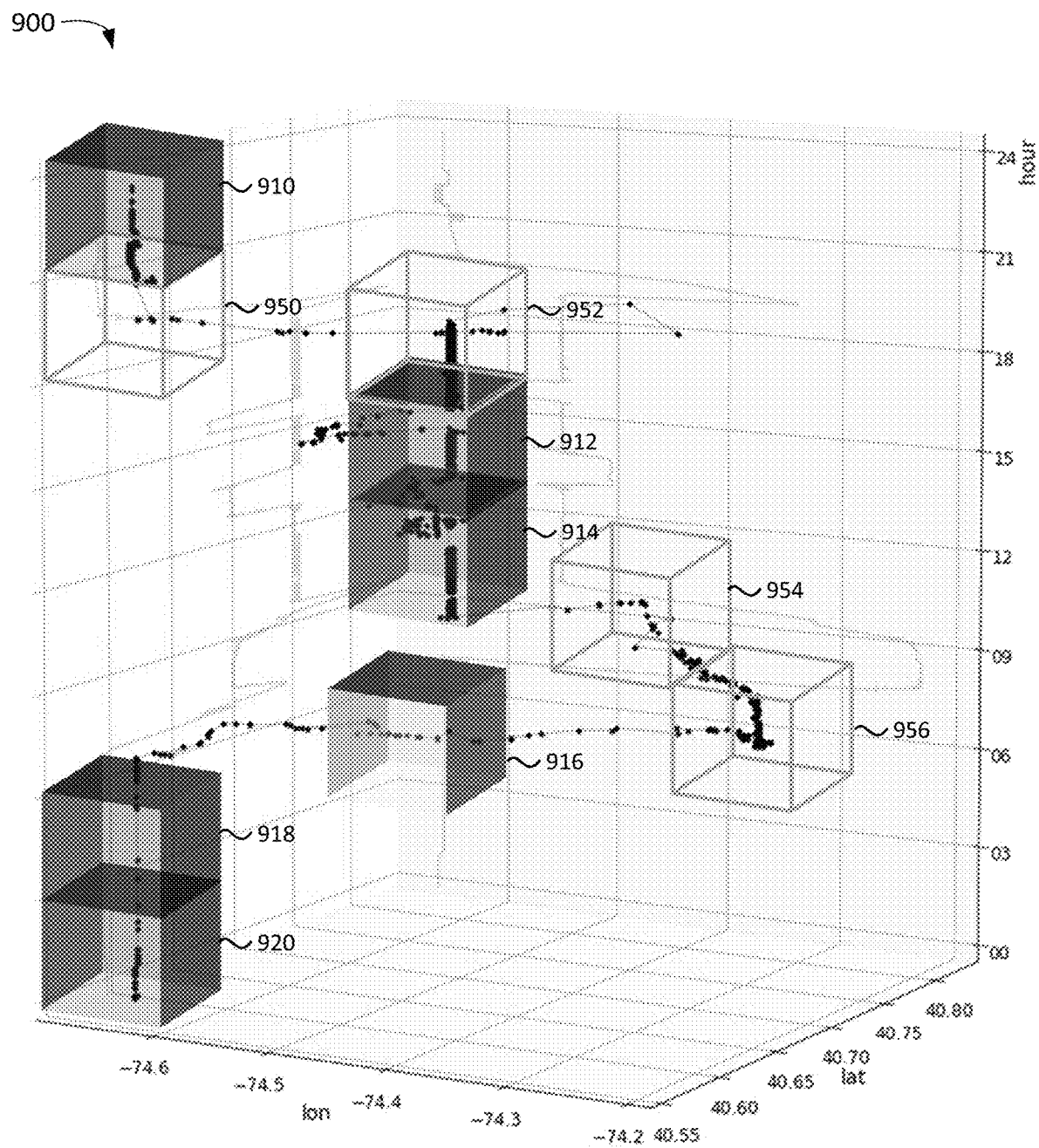
FIG. 9 illustrates a graph of user location data along with geographical time bins according to an implementation described herein.

As shown in FIG. 6, process 600 may include dividing a daily movement pattern for the user into geographical time bins (block 610). A geographical time bin (gtbin) may be represented as:

$$gtbin = \left( int\left(\frac{lat}{resolution_{gbin}}\right), int\left(\frac{lon}{resolution_{gbin}}\right), int\left(\frac{hr}{resolution_{time}}\right) \right),$$

where hr is the hour of the day, lat is geographical latitude, ion is geographical longitude, $resolution_{gbin}$ is the resolution of the geographical grid (e.g., $10^{-2}$), $resolution_{time}$ is the time resolution (e.g., 3 hours), and int is the integer function. Thus, a geographical time bin may be represented as a three-dimensional (3D) cuboid on a 3D plot of a geographical area plotted against time, as shown in FIG. 9, described below.

Process 600 may further include determining primary locations for the user (block 620). The number of primary locations may be selected as n (e.g., n=3 for three primary locations, etc.) and a number of most frequently visited geographical bins may be selected as m (e.g., m=5 for the five most frequently visited geographical bins, etc.). The m most visited geographical time bins of size $resolution_{gbin}$ over a selected lookback period (e.g., 30 days, etc.) may be determined and then the most frequently visited location cell of a finer resolution of $resolution_{loc}$ in each of the m most frequently visited geographical bins may be identified. The distances between the m location cells of size $resolution_{loc}$ may be computed and, if the distance between two location cells is less than a distance threshold, the less frequently visited location cell of the two location cells may be eliminated. From the remaining location cells, the top n location cells may be selected as the primary locations for the user. A primary location may be represented as:

$$location = \left( int\left(\frac{lat}{resolution_{loc}}\right), int\left(\frac{lon}{resolution_{loc}}\right) \right) * resolution_{loc}.$$

Process 600 may further include determining a geographical time bins missing rate for the user during the time period based on current location data for the time period and the determined geographical time bins for the user (block 630). The geographical time bins missing rate (GM) may be computed based on:

$$GM = 1 - \sum_{i=1}^{N} w_i,$$

where N is the total number of gtbins visited during the time period, and where $w_i$ is the weight assigned to $gtbin_i$, computed as:

$$w_i = \frac{count(gtbin_i)}{\sum_{j=1}^{M} count(gtbin_j)},$$

where M is the total number of all geographical time bins visited by the user during the lookback period. The lookback period may correspond to the time period for which the historical location data was obtained and used to generate the geographical time bins for the user. Thus, the weight for each unique geographical time bin may be defined as a ratio of the number of occurrences of the geographical time bin to a total number of occurrences of all the geographical time bins over the lookback period. Regular geographical time bins are selected as the geographical time bins that have a number of occurrences that is higher than a threshold. The geographical time bins missing rate GM is thus defined as 1 minus the sum of the visited regular geographical time bin weights. A graphical illustration of a geographical time bins missing rate is shown in FIG. 9.

Figure 10:
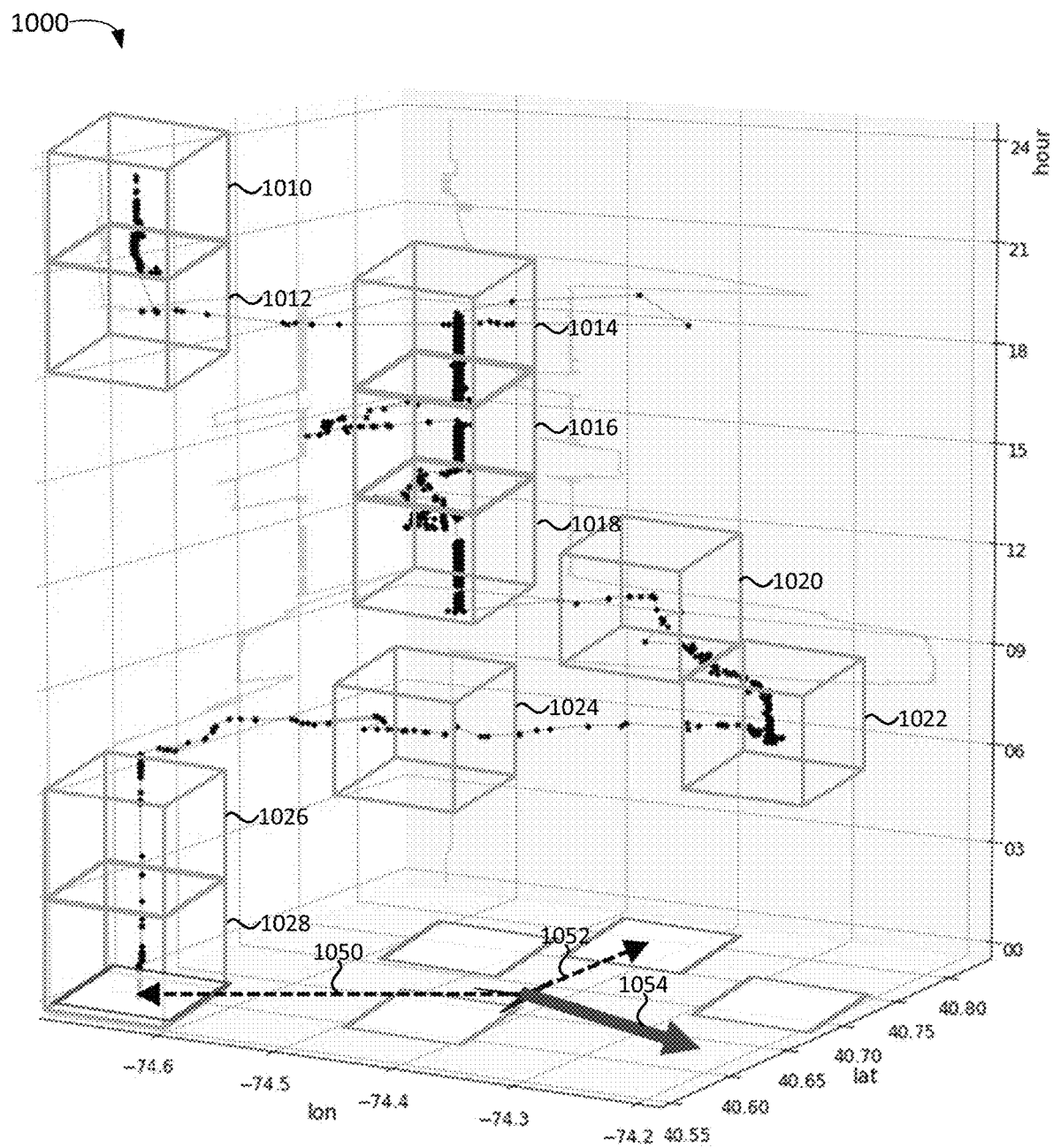
FIG. 10 illustrates a graph of user location data and an off-center distance according to an implementation described herein.

Process 600 may further include determining an off-center distance for the user during the time period based on the current location data for the time period and the determined primary locations for the user (block 640). The off-center distance D may represent the distance from locations visited by the user during the time period to the closest primary location and may be computed as:

$$D = \frac{1}{N} \sum_{i=1}^{N} d_i,$$

where N is the total number of gtbins visited during the time period, and where $d_i$ is the Euclidian distance in coordinates between the i-th visited gtbin and the closest primary location, computed using:

$$d_i = \sqrt{(lat_{gbin_i} - lat_{pl})^2 + (lon_{gbin_i} - lon_{pl})^2},$$

where $lat_{gbin_i}$ and $lon_{gbin_i}$ are the latitude and longitude of the i-th visited gtbin, respectively, and where $lat_{pl}$ and $lon_{pl}$ are latitude and longitude of the closest primary location, respectively. A graphical illustration of an off-center distance is shown in FIG. 10.

Figure 11:
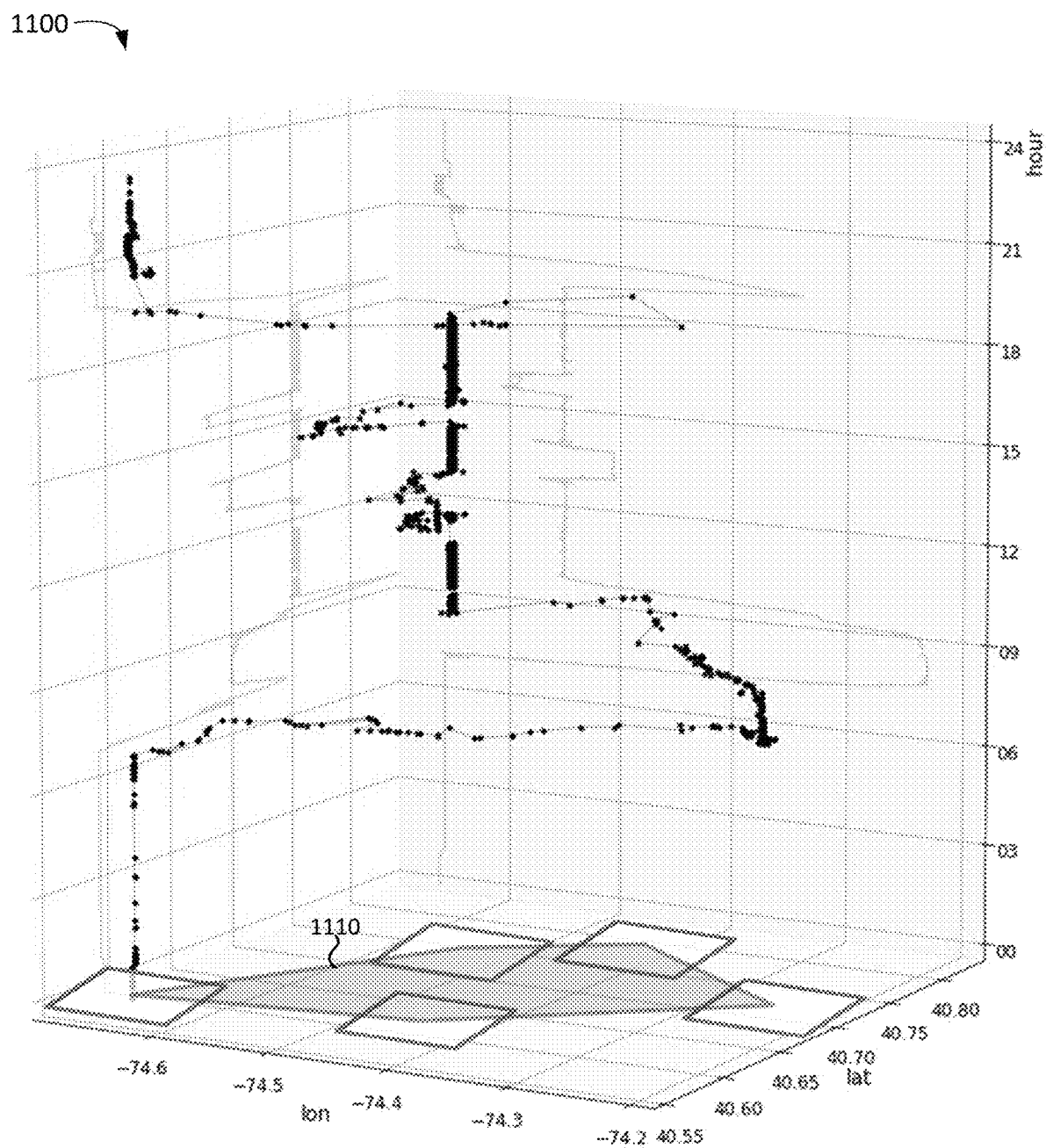
FIG. 11 illustrates a graph of user location data and an area of extent according to an implementation described herein.

Process 600 may further include determining an area of extent for the user during the time period based on the current location data for the time period (block 650). The area of extent may represent an approximate geographical area covered by the user's movements during the time period, and may be approximated by a sum of the difference between the maximum and minimum latitude associated with all the gtbins visited during the time period and difference between the maximum and minimum longitude associated with all the gtbins visited during the time period. Thus, the area of extent AR may be computed as:

$$AR = \max(lat_{gbin}) - \min(lat_{gbin}) + \max(lon_{gbin}) - \min(lon_{gbin}),$$

where $lat_{gbin}$ and $l_{gbin}$ latitude and longitude of a gtbin visited during the time period. A graphical illustration of an area of extent is shown in FIG. 11.

The mobility score may be determined based on the determined geographical time bin missing rate, off-center distance, and area of extent (block 660). For example, the computed geographical time bin missing rate GM, the off-center distance OC, and the area of extent AR may be normalized to a same scale, such as, for example, a 0-100 scale. The mobility score for the user for the time period may then be computed as a geometric mean of the computed geographical time bin missing rate GM, the off-center distance OC, and the area of extent AR using:

$$\text{mobility score} = (\text{Normalize}(GM) * \text{Normalize}(OC) * \text{Normalize}(AR))^{1/3}.$$

Figure 7:
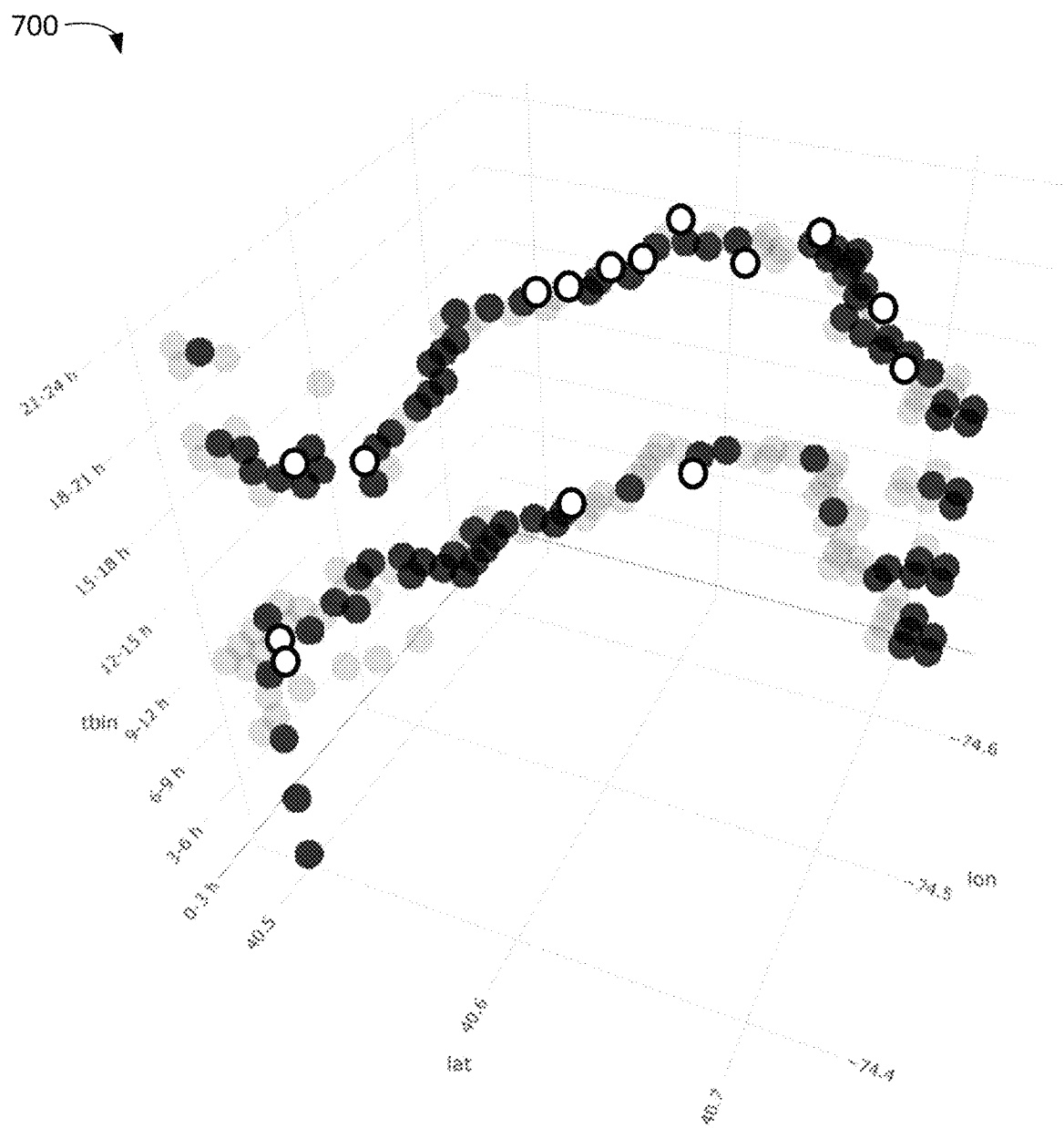
FIG. 7 illustrates a graph of user location data for a user associated with a low mobility score according to an implementation described herein.

FIG. 7 illustrates a graph 700 of user location data for a user associated with a low mobility score according to an implementation described herein. As shown in FIG. 7, graph 700 illustrates location data for a user for a 24-hour period and includes visited regular gtbins 710, missed regular gtbins 720, and other daily activities 730. Since there are a relatively low number of missed regular gtbins 720 in graph 700, and there are a relatively low number of daily activities 730 far away from the user's regular gtbins, the computed mobility score for the user for the 24-hour period may be a low mobility score.

Figure 8:
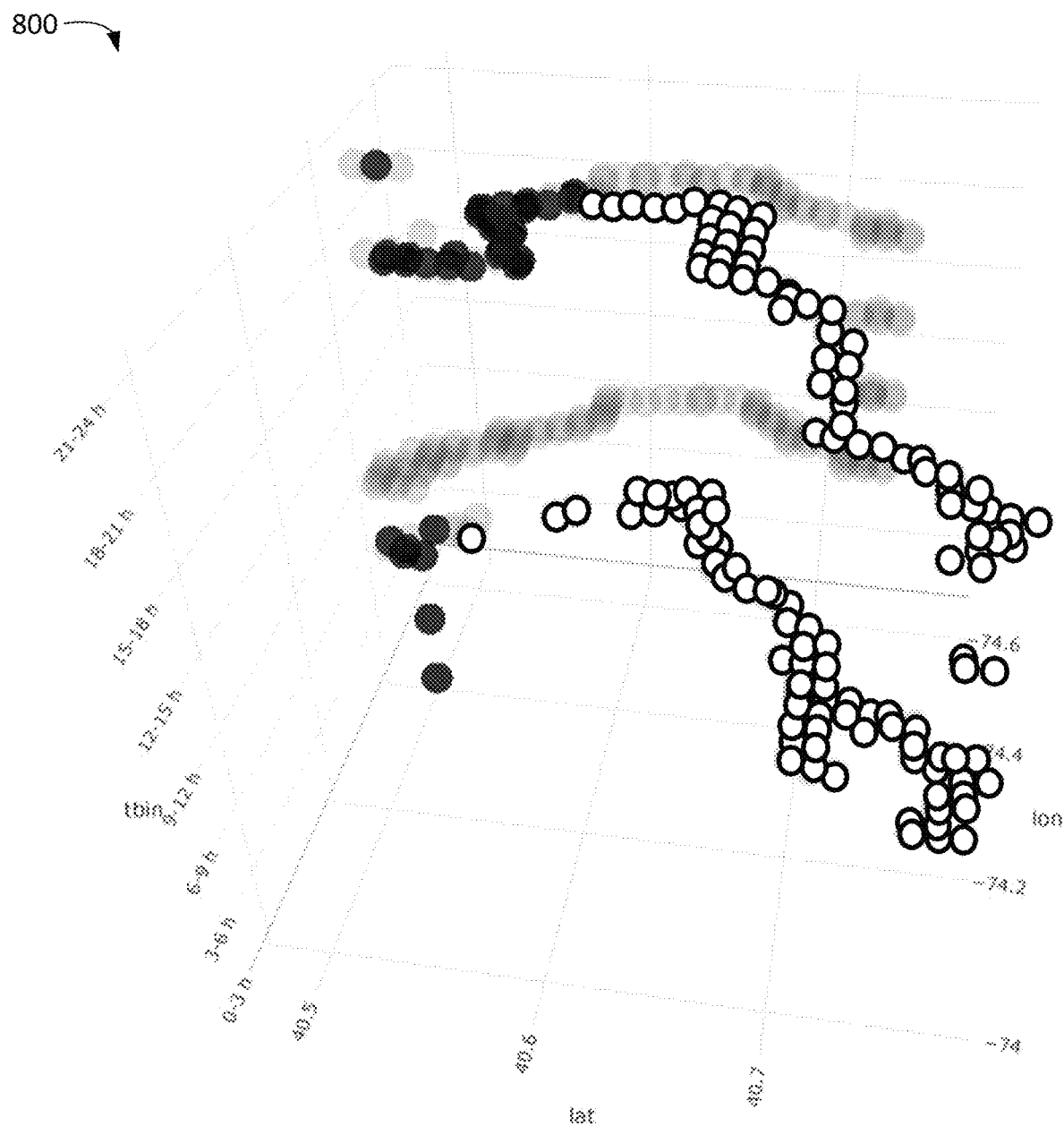
FIG. 8 illustrates a graph of user location data for a user associated with a high mobility score according to an implementation described herein.

FIG. 8 illustrates a graph 800 of user location data for a user associated with a high mobility score according to an implementation described herein. As shown in FIG. 8, graph 800 illustrates location data for a user for a 24-hour period and includes visited regular gtbins 810, missed regular gtbins 820, and other daily activities 830. Since there are a large number of missed regular gtbins 820 in graph 800, and a large number of daily activities 830 far away from the user's regular gtbins, the computed mobility score for the user for the 24-hour period may be a high mobility score.

FIG. 9 illustrates a graph 900 of user location data along with geographical time bins according to an implementation described herein. As shown in FIG. 9, graph 900 includes gtbins 910, 912, 914, 916, 918, 920, 950, 952, 954, and 956 visited by a user during a 24-hour period. Gtbins 910, 912, 914, 916, 918, and 920 may corresponds to the user's regular gtbins and associated with the user's primary locations and gtbins 950, 952, 954, and 956 may correspond to visited gtbins.

FIG. 10 illustrates a graph 1000 of user location data and an off-center distance according to an implementation described herein. As shown in FIG. 10, graph 1000 includes gtbins 1010, 1012, 914, 1016, 1018, 1020, 1022, 1024, 1026, and 1028 visited by a user during a 24-hour period. The user's off-center distance may be computed as the average of distances 1050, 1052, and 1054 from the user's visited gtbins to the closest primary location associated with the user.

FIG. 11 illustrates a graph 1100 of user location data and an area of extent according to an implementation described herein. As shown in FIG. 10, graph 1000 includes an area of extent 1110 computed for the user during a 24-hour period based on the location data included in graph 1000 for the user for the 24-hour period.

Figure 12:
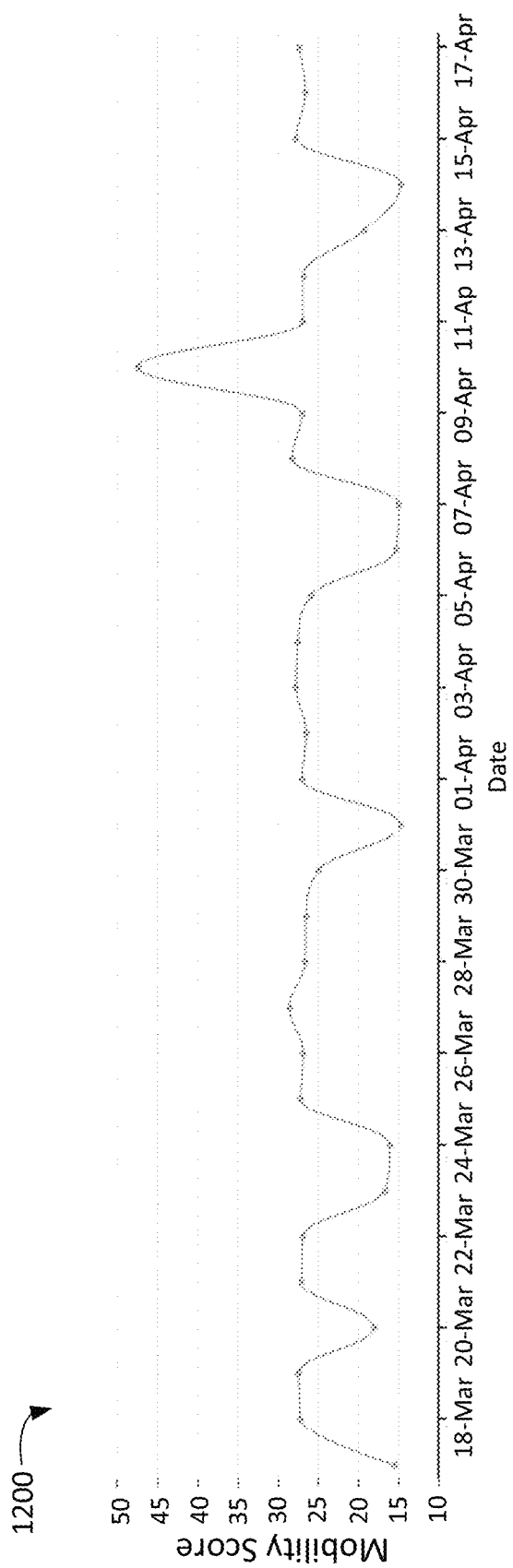
FIG. 12 illustrates a graph of a mobility score over time according to an implementation described herein.

FIG. 12 illustrates a graph 1200 of a mobility score over time for a user according to an implementation described herein. As shown in FIG. 12, the user's mobility score may vary each day based on the user's movements and may be used to improve network performance and/or customer experience by providing information relating to the changing mobility score to SON system 170, network management system 180, and/or CEM system 190.

Figure 13:
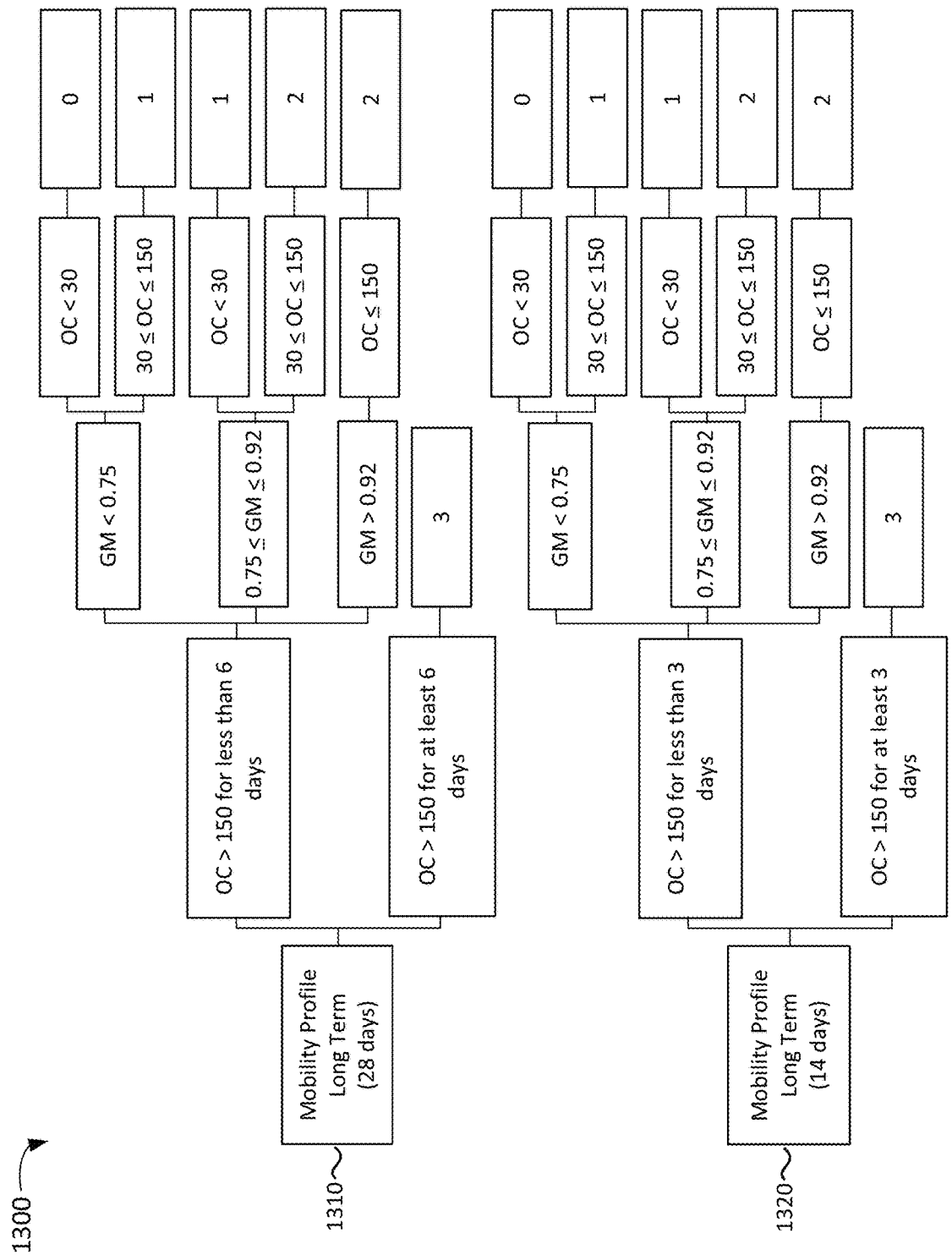
FIG. 13 illustrates an exemplary process for determining a mobility profile score according to an implementation described herein.

FIG. 13 illustrates an exemplary process 1300 for determining a mobility profile score according to an implementation described herein. As shown in FIG. 13, a long-term mobility profile score 1310 for a user may be computed for a longer lookback period of 28 days and a short-term mobility profile score 1320 for the user may be computed for a shorter lookback period of 14 days. Long-term mobility profile score 1310 may be determined to be 0, if the user's off-center distance score OC is greater than 150 for less than 6 days during the lookback period, the user's geographical time bins missing score GM is less than 0.75, and if the user's OC score is less than 30; a mobility profile score of 1, if the user's OC score is greater than 150 for less than 6 days during the lookback period, and if the user's GM score is less than 0.75 and the user's OC score is between 30 and 150, or if the user's GM score is between 0.75 and 0.92 and the user's OC score is less than 30; a mobility profile score of 2, if the user's OC score is greater than 150 for less than 6 days during the lookback period, and if the user's GM score is between 0.75 and 0.92 and the user's OC score is between 30 and 150, or if the user's GM score is greater than 0.92 and the user's OC score is less than 150; and a mobility profile score of 3, if the user's OC score is greater than 150 for at least 6 days during the 28 day lookback period.

Short-term mobility profile score 1320 may be determined to be 0, if the user's OC score is greater than 150 for less than 3 days during the lookback period and is less than 0.75, and if the user's OC score is less than 30; a mobility profile score of 1, if the user's OC score is greater than 150 for less than 3 days during the lookback period, and if the user's GM score is less than 0.75 and the user's OC score is between 30 and 150, or if the user's GM score is between 0.75 and 0.92 and the user's OC score is less than 30; a mobility profile score of 2, if the user's OC score is greater than 150 for less than 3 days during the lookback period, and if the user's GM score is between 0.75 and 0.92 and the user's OC score is between 30 and 150, or if the user's GM score is greater than 0.92 and the user's OC score is less than 150; and a mobility profile score of 3, if the user's OC score is greater than 150 for at least 3 days during the 28 day lookback period.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5 and 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    collecting historical location data for a user equipment (UE) device associated with a user;
    determining a movement pattern for the user based on the collected historical location data, wherein determining the movement pattern for the user includes determining at least one primary location for the user;
    obtaining current location data for the UE device over a time period;
    determining a mobility score for the user for the time period based on the determined movement pattern and the obtained current location data, wherein the mobility score is associated with the user's movements during the time period with respect to the determined movement pattern for the user, wherein determining the mobility score for the user for the time period includes determining an off-center distance based on a distance for the user from the at least one primary location during the time period; and
    providing the determined mobility score for the user to another device configured to adjust one or more parameters of a radio access network (RAN) associated with the UE device based on the determined mobility score.

2. The method of claim 1, wherein providing the determined mobility score for the user to another device configured to adjust one or more parameters of the RAN associated with the UE device based on the determined mobility score includes:
    providing the mobility score to a self-organizing network (SON) device associated with the RAN; and
    adjusting, by the SON device, at least one of an antenna tilt parameter, a power distribution parameter, a carrier aggregation parameter, a handover parameter, or a neighbor list parameter for a base station associated with the RAN based on the mobility score.

3. The method of claim 1, further comprising:
    aggregating a plurality of mobility scores for a plurality of users in a geographical area; and
    adjusting a self-organizing network (SON) parameter for a base station in the geographical area based on the aggregated plurality of mobility scores.

4. The method of claim 3, wherein adjusting the SON parameter for the base station in the geographical area based on the aggregated plurality of mobility scores includes:
    determining, based on the aggregated plurality of mobility scores, that UE devices associated with the base station have changed movement patterns from a first area to a second area; and
    adjusting at least one of an antenna tilt parameter, a power distribution parameter, a carrier aggregation parameter, a handover parameter, or a neighbor list parameter for the base station to increase signal coverage in the second area, in response to determining that the UE devices associated with the base station have changed movement patterns from the first area to the second area.

5. The method of claim 3, wherein adjusting the SON parameter for the base station in the geographical area based on the aggregated plurality of mobility scores includes:
    determining, based on the aggregated plurality of mobility scores, that UE devices associated with the base station are associated with lower mobility scores than mobility scores determined for the UE devices during a previous time period; and
    adjusting at least one of an antenna tilt parameter, a power distribution parameter, a carrier aggregation parameter, a handover parameter, or a neighbor list parameter for the base station to increase signal capacity, based on determining that UE devices associated with the base station are associated with lower mobility scores than mobility scores determined for the UE devices during the previous time period.

6. The method of claim 1, wherein determining the movement pattern for the user based on the collected historical location data includes:

dividing a daily movement pattern associated with the user into a plurality of geographical time bins, wherein each geographical time bin, of the plurality of geographical time bins, corresponds to a location range where the user spends time during a particular range of times each time period.

7. The method of claim 6, wherein determining the mobility score for the user for the time period based on the determined movement pattern and the obtained current location data includes:
determining a geographical time bin missing rate for the user for the time period based on the obtained current location data and the plurality of geographical time bins, wherein the geographical time bin missing rate is based on a number of geographical time bins, of the plurality of geographical time bins, not visited by the user during the time period; and
determining the mobility score for the user for the time period based on the determined geographical time bin missing rate for the user for the time period.

8. The method of claim 6, wherein determining the movement pattern for the user based on the collected historical location data further includes:
determining a plurality of primary locations for the user based on a number of most frequently visited geographical time bins of the plurality of geographical time bins; and
wherein determining the mobility score for the user for the time period based on the determined movement pattern and the obtained current location data includes:
determining the off-center distance for the user for the time period based on the obtained current location data and the plurality of primary locations, wherein the off-center distance corresponds to a distance of the user during the time period from a closest primary location of the plurality of primary locations.

9. The method of claim 6, wherein determining the mobility score for the user for the time period based on the determined movement pattern and the obtained current location data includes:
determining an area of extent for the user for the time period based on the obtained current location data, wherein the area of extent for the user for the time period is based on maximum latitudinal and longitudinal differences between geographical time bins visited by the user during the time period; and
determining the mobility score for the user for the time period based on the area of extent for the user for the time period.

10. The method of claim 1, further comprising:
determining a mobility profile score for the user, wherein the mobility profile score for the user measures an extent to which a daily movement pattern of the user varies.

11. The method of claim 1, further comprising:
providing the mobility score to a network management device configured to at least one of troubleshoot the RAN or perform load balancing on the RAN.

12. A device comprising:
a processor configured to:
collect historical location data for a user equipment (UE) device associated with a user;
determine a movement pattern for the user based on the collected historical location data, wherein, when determining the movement pattern for the user, the processor is further configured to determine at least one primary location for the user;
obtain current location data for the UE device over a time period;
determine a mobility score for the user for the time period based on the determined movement pattern and the obtained current location data, wherein the mobility score is associated with the user's movements during the time period with respect to the determined movement pattern for the user, wherein, when determining the mobility score for the user for the time period, the processor is further configured to determine an off-center distance based on a distance for the user from the at least one primary location during the time period; and
provide the determined mobility score for the user to another device configured to adjust one or more parameters of a radio access network (RAN) associated with the UE device based on the determined mobility score.

13. The device of claim 12, wherein, when providing the determined mobility score for the user to another device configured to adjust one or more parameters of the RAN associated with the UE device based on the determined mobility score, the processor is further configured to:
provide the mobility score to a self-organizing network (SON) device associated with the RAN.

14. The device of claim 12, wherein the processor is further configured to:
aggregate a plurality of mobility scores for a plurality of users in a geographical area; and
adjust a self-organizing network (SON) parameter for a base station in the geographical area based on the aggregated plurality of mobility scores.

15. The device of claim 14, wherein, when adjusting the SON parameter for the base station in the geographical area based on the aggregated plurality of mobility scores, the processor is further configured to:
determine, based on the aggregated plurality of mobility scores, that UE devices associated with the base station have changed movement patterns from a first area to a second area; and
adjust at least one of an antenna tilt parameter, a power distribution parameter, a carrier aggregation parameter, a handover parameter, or a neighbor list parameter for the base station to increase signal coverage in the second area, in response to determining that the UE devices associated with the base station have changed movement patterns from the first area to the second area.

16. The device of claim 14, wherein, when adjusting the SON parameter for the base station in the geographical area based on the aggregated plurality of mobility scores, the processor is further configured to:
determine, based on the aggregated plurality of mobility scores, that UE devices associated with the base station are associated with lower mobility scores than mobility scores determined for the UE devices during a previous time period; and
adjust at least one of an antenna tilt parameter, a power distribution parameter, a carrier aggregation parameter, a handover parameter, or a neighbor list parameter for the base station to increase signal capacity, based on determining that UE devices associated with the base station are associated with lower mobility scores than mobility scores determined for the UE devices during the previous time period.

17. The device of claim 12, wherein, when determining the movement pattern for the user based on the collected historical location data, the processor is further configured to:
- divide a daily movement pattern associated with the user into a plurality of geographical time bins, wherein each geographical time bin, of the plurality of geographical time bins, corresponds to a location range where the user spends time during a particular range of times each time period.

18. The device of claim 17, wherein, when determining the mobility score for the user for the time period based on the determined movement pattern and the obtained current location data, the processor is further configured to:
- determine a geographical time bin missing rate for the user for the time period based on the obtained current location data and the plurality of geographical time bins, wherein the geographical time bin missing rate is based on a number of geographical time bins, of the plurality of geographical time bins, not visited by the user during the time period;
- determine the off-center distance for the user for the time period based on the obtained current location data and the plurality of geographical time bins, wherein the off-center distance corresponds to a distance of the user during the time period from a closest primary location of a plurality of primary locations associated with the user;
- determine an area of extent for the user for the time period based on the obtained current location data, wherein the area of extent for the user for the time period is based on maximum latitudinal and longitudinal differences between geographical time bins visited by the user during the time period; and
- determine the mobility score for the user for the time period based on the geographical time bin missing rate for the user for the time period, the off-center distance for the user for the time period, and the area of extent for the user for the time period.

19. The device of claim 12, wherein the processor is further configured to:
- determine a mobility profile score for the user, wherein the mobility profile score for the user measures an extent to which a daily movement pattern of the user varies.

20. A system comprising:
a self-organizing network (SON) device; and
a mobility pattern detection device configured to:
- collect historical location data for a user equipment (UE) device associated with a user;
- determine a movement pattern for the user based on the collected historical location data, wherein, when determining the movement pattern for the user, the mobility pattern detection device is further configured to determine at least one primary location for the user;
- obtain current location data for the UE device over a time period;
- determine a mobility score for the user for the time period based on the determined movement pattern and the obtained current location data, wherein the mobility score represents an extent to which the user's movements during the time period deviate from the determined movement pattern for the user, and wherein, when determining the mobility score for the user for the time period, the mobility pattern detection device is further configured to determine an off-center distance based on a distance for the user from the at least one primary location during the time period; and
- provide the determined mobility score for the user to the SON device;

wherein the SON device is configured to:
- adjust at least one of an antenna tilt parameter, a power distribution parameter, a carrier aggregation parameter, a handover parameter, or a neighbor list parameter for a base station associated with a radio access network based on the determined mobility score.

* * * * *